US012453974B2

(12) United States Patent
Barimani et al.

(10) Patent No.: US 12,453,974 B2
(45) Date of Patent: Oct. 28, 2025

(54) ROCK PROCESSING SYSTEM WITH AT LEAST TWO VALUE GRAIN GRADING CURVES AND AUTOMATED OPERATION DEPENDENT ON THE GRADING CURVE DISCHARGES

(71) Applicant: Kleemann GmbH, Göppingen (DE)

(72) Inventors: Cyrus Barimani, Königswinter (DE); Tobias Böckle, Weinstadt (DE)

(73) Assignee: Kleemann GmbH, Göppingen (DE)

( * ) Notice: Subject to any disclaimer, the term of this patent is extended or adjusted under 35 U.S.C. 154(b) by 370 days.

(21) Appl. No.: 18/353,367

(22) Filed: Jul. 17, 2023

(65) Prior Publication Data

US 2024/0024891 A1 Jan. 25, 2024

(30) Foreign Application Priority Data

Jul. 19, 2022 (DE) ..................... 10 2022 118 042.5

(51) Int. Cl.
*B02C 25/00* (2006.01)
*B02C 21/02* (2006.01)
(Continued)

(52) U.S. Cl.
CPC ............ *B02C 25/00* (2013.01); *B02C 21/026* (2013.01); *B02C 23/02* (2013.01); *B02C 23/12* (2013.01)

(58) Field of Classification Search
CPC ....... B02C 25/00; B02C 21/026; B02C 23/02; B02C 23/12
See application file for complete search history.

(56) References Cited

U.S. PATENT DOCUMENTS 4,281,800 A 8/1981 Flavel
4,909,449 A 3/1990 Etheridge
(Continued)

FOREIGN PATENT DOCUMENTS

DE 102006001043 A1 * 7/2007 ............... B03B 9/00
DE 102017124958 A1 4/2019
(Continued)

OTHER PUBLICATIONS

European Search Report for corresponding patent application No. 23185123.9, dated Jan. 3, 2024, 8 pages (not prior art).
(Continued)

*Primary Examiner* — William P Bartlett
(74) *Attorney, Agent, or Firm* — Gary L. Montle; Lucian Wayne Beavers; Patterson Intellectual Property Law, PC

(57) ABSTRACT

A rock processing system as disclosed herein includes at least one rock processing apparatus for crushing and/or sorting granular mineral material according to size, which comprises: a material feeding apparatus including a material buffer; at least one crushing apparatus; at least one screening apparatus; at least one conveyor apparatus; at least two discharge conveyor apparatuses; at least one quantity sensor for each of the at least two discharge conveyor apparatuses; a data memory (62) connected in signal-transmitting fashion to a control unit and/or to the quantity sensors for transmitting information. The control unit is designed to control an operation of at least one system component according to detection signals, which represent the discharge quantities accruing per unit of time in different value grain grading curves, and according to at least one data relationship stored in the data memory.

14 Claims, 4 Drawing Sheets

(51) Int. Cl.
*B02C 23/02* (2006.01)
*B02C 23/12* (2006.01)

(56) References Cited

U.S. PATENT DOCUMENTS

| | | | |
|---|---|---|---|
| 11,383,246 B2 | 7/2022 | Eckert et al. | |
| 2010/0091103 A1* | 4/2010 | Peltonen | B02C 25/00 348/82 |
| 2021/0154706 A1 | 5/2021 | Dirscherl et al. | |
| 2021/0325899 A1 | 10/2021 | Grambihler et al. | |

FOREIGN PATENT DOCUMENTS

| | | | | |
|---|---|---|---|---|
| DE | 102020003966 A1 | | 1/2022 | |
| EP | 3936234 A1 | * | 1/2022 | B02C 21/026 |
| WO | 2020007846 A1 | | 1/2020 | |

OTHER PUBLICATIONS

Corresponding co-pending U.S. Appl. No. 18/353,332 (not prior art).
Corresponding co-pending U.S. Appl. No. 18/353,344 (not prior art).
Corresponding co-pending U.S. Appl. No. 18/353,357 (not prior art).

* cited by examiner

ROCK PROCESSING SYSTEM WITH AT LEAST TWO VALUE GRAIN GRADING CURVES AND AUTOMATED OPERATION DEPENDENT ON THE GRADING CURVE DISCHARGES

CROSS-REFERENCES TO RELATED APPLICATIONS

This application claims benefit of German Patent Application No. 10 2022 118 042.5, filed Jul. 19, 2022, and which is hereby incorporated by reference.

BACKGROUND

The invention relates to a rock processing system having at least one rock processing apparatus for crushing and/or sorting granular mineral material according to size.

Such a rock processing system is known from DE 10 2020 003 966 A1. The known rock processing system, which is made up of only one single rock processing apparatus, teaches, for the purpose of achieving a final grain product that is as constant as possible, to detect quantitatively the entire material stream from a crushing apparatus to a post-screen by way of a first belt scale and to detect quantitatively by way of a second belt scale the value grain of the sole value grain grading curve stockpiled by a discharge conveyor belt. The quantity of oversize grain separated in the post-screen, which has a larger grain size than the desired value grain and which is returned for another pass through the crushing apparatus, is estimated or calculated quantitatively as the difference between the total detected material quantity minus the detected quantity of value grain.

On the basis of the values detected in accordance with DE 10 2020 003 966 A1, it is possible to ascertain a value grain portion and an oversize grain portion of the rock processing system in its respective operating state. On the basis of data relationships previously stored in a data memory, the control unit of the known rock processing system adjusts operating parameters of the rock processing system so that the value grain portion is increased and the oversize grain portion is minimized. Control variables are for example the speed of a rotor of a crushing apparatus, a crush gap of the crushing apparatus, the feed quantity of material to be crushed. It is known in this connection that the reduction of the crush gap brings about a shift of the grain sizes obtained in the final product toward smaller grain sizes and that a reduction of the speed of the rotor of the crushing apparatus shifts the grain sizes obtained in the final product toward larger grain sizes. By changing the quantity of material fed into the crushing apparatus, it is possible to influence the size of the value grain portion.

To achieve a production that is as constant as possible, DE 10 2020 003 966 A1 further recommends discharging non-crushable foreign material in a timely manner, which in an obvious way merely avoids a failure and thus a standstill of the crushing apparatus of the rock processing system.

A further rock processing system is known from DE 10 2017 124 958 A1, the control unit of which adjusts in automated fashion an infeed and consequently a fill ratio of a crushing apparatus directly or indirectly as a function of a mechanical load on the crushing apparatus.

A disadvantage of the rock processing system known from DE 10 2020 003 966 A1 is on the one hand its applicability to only one value grain grading curve and its value grain portion. The likewise disclosed focus on minimizing the portion of returned oversize grain is essentially nothing but the maximization of the value grain portion, since in the known rock processing system the oversize grain portion is not detected but is only estimated or calculated from the detected value grain portion. The oversize grain portion assumed according to DE 10 2020 003 966 A1 is therefore always a direct linear function of the actually detected value grain portion and represents the value grain portion just as the oversize grain portion.

For the cases of multiple value grain grading curves relevant in industrial reality and a targeted adjustment of their portions in the totality of the processed material, DE 10 2020 003 966 A1 offers no solution.

Furthermore, a focus solely on the value grain portion or on minimizing the quantity of returned oversize grain is not always helpful, since oversize grain supplements the fed material with pre-crushed and thus normally already smaller grain than the grain of the fed material and thus acts as support grain. A lack of support grain can destabilize the crushing process and have a negative effect on the quality of the final grain product. The compromised quality can result in an increasingly occurring disadvantageous grain shape, for example in a reduced cubicity.

SUMMARY

A rock processing system of the present disclosure may be developed such that it allows for an automated operation on the basis of a more comprehensive target size definition. In particular, the further developed rock processing system is to make it possible to coordinate quantity flows of multiple value grain grading curves with one another in quantitative terms in a predetermined target tolerance range.

For achieving this object, a rock processing system as disclosed herein comprises: at least two discharge conveyor apparatuses for conveying processed material out of the rock processing system respectively onto a separate stockpile, each of the at least two discharge conveyor apparatuses conveying processed material of a different value grain grading curve output by the at least one screening apparatus; at least one quantity sensor for each of the at least two value grain grading curves, respectively for detecting a quantity value representing a discharge quantity of processed material accruing per unit of time in the respective value grain grading curve; wherein the control unit is designed to control an operation of at least one system component according to detection signals, the detection signals representing discharge quantities accruing per unit of time in different value grain grading curves, and according to at least one data relationship stored in the data memory, which, by taking into consideration at least one predetermined target variable or at least one predetermined target variable range, sets the detection signals of the at least one quantity sensor and/or a value derived from the detection signals of the at least one quantity sensor quantitatively or qualitatively in relation to at least one control operating parameter and/or to at least one change of a control operating parameter of at least one system component.

A rock processing system according to the present disclosure comprises at least two discharge conveyor apparatuses to convey the material of the different value grain grading curves, which logically have different grain sizes, onto different stockpiles spatially separated from one another.

The at least one quantity sensor per value grain grading curve allows for the detection of the discharge quantity accruing per unit of time in the respective value grain grading curve and thus the detection of a value, which is used for controlling or regulating the operation of the rock processing system.

At least one data relationship is stored in the data memory, which represents a relationship between detection signals of the at least one quantity sensor, at least one value or value range of a target variable and the at least one control operating parameter. The term "control operating parameter" merely states that it concerns an operating parameter of the rock processing system, which can be modified by the control unit by way of control interventions.

The data relationship may be stored as a characteristic map, as an analytic function, as an allocation table, allocation matrix or allocation tensor, as a fuzzy set or the like, so that starting from a detection signal as input datum of the data relationship and further starting from a desired and hence predetermined setpoint value or setpoint value range of a target variable as at least one further input datum of the data relationship, the data relationship as output datum indicates at least one control operating parameter quantitatively or qualitatively, the adjustment of which at the system component associated with the respective control operating parameter changes an actual value of the target variable toward the predetermined setpoint value or setpoint value range.

According to the present disclosure, a control unit is designed to control a system component even if it does not adjust at least one control operating parameter ascertained with the at least one data relationship directly on the respective system component, but rather recommends the ascertained control operating parameter via an output at an output device to a machine operator, who either accepts the recommendation directly or who personally adjusts the recommended control operating parameter.

Depending on the type of the target variable and its value, the target variable or the target variable range may be transmitted by a higher-order data processing system to the data memory or may be input locally by an operator via an input device specified further below and stored in the data memory.

In the case of a quantitative data relationship, the data relationship outputs, for a set of input data, a set of quantitative output data, that is, a set of quantitatively determined control operating parameters. It is possible for the set of output data to comprise only one control operating parameter.

In the case of a qualitative data relationship, the data relationship may indicate, for a set of input data, respectively one change direction for one set of output data, for example. Thus, for each control operating parameter of the set of output data, a specification may be output as to whether the control operating parameter is to be quantitatively increased or decreased. For a control operating parameter that is not to be changed, either no output is generated or an output is generated that indicates the respective control operating parameter as one that is not to be changed.

The qualitative data relationship may qualify the change requirement of a control operating parameter in more detail, for example as "slightly increase or reduce", "normally increase or reduce", "greatly increase or reduce". Further refinements of the gradations are conceivable.

The control unit may receive or retrieve a quantitative change value from a data processing program or from the data memory, which is to be applied quantitatively onto the respective control operating parameter in accordance with the output change requirement. In this manner, every control operating parameter may be changed incrementally with the quantitative change value until the actual value of the target variable corresponds to the setpoint value with sufficient precision or is within a predetermined setpoint value range.

The data relationship may be established in advance on the basis of already known causal relationships and stored in the data memory. Thus, relationships between the fill ratio of a crushing apparatus and the grain shape obtained during the crushing process in the crushing apparatus as well as the wear occurring on components of the crushing apparatus are already known. Further known are relationships between an obtained oversize grain portion and the rotor speed of the crushing rotor and the set crush gap and the like, to mention only some relationships of influence variables by way of example. The data relationship may be stored as an initial data relationship in the data memory and be further refined by subsequent test operations or expanded by considering further possible causal relationships between possible further influence variables, possible target variables and output data. For ascertaining these causal relationships, it is possible to use methods of artificial intelligence, such as deep learning, by which the control unit is able in quasi autonomous fashion to expand at least one data relationship in the data memory by the detected causal relationships or to correct established causal relationships and/or to improve them in their accuracy. The application of conventional analytical methods in test operation, in order to ascertain causal relationships between input variables, target variables and output data, is additionally or alternatively possible.

It is furthermore possible, in particular by application of methods of artificial intelligence, to collect data at existing rock processing systems of the same kind, to transmit these to an evaluation unit and to evaluate them methodically using the evaluation unit or at least with the participation of the evaluation unit. The data relationships detected with the participation of the evaluation unit may be transmitted for example via a mobile telephony network or other data transmission links directly, or in the course of required maintenance work, into the data memory of the rock processing system. In this way, it is possible continuously to improve the at least one data relationship with increasing operating time in terms of its precision and accuracy. Especially for the analysis and ascertainment of complex multidimensional causal relationships, that is, in the case of multiple influence variables, target variables and output data mutually influencing one another, the application of methods of artificial intelligence is meaningful and helpful in order to extract data relationships from a plethora of observed operating data.

The term "value grain grading curve" designates a grain fraction obtained by a screening process, which comprises a predetermined desired final grain product of the rock processing operation. This is to be distinguished from undersize grain, which has a smaller grain size than the grain size of the smallest desired final grain product, and oversize grain, which has a larger grain size than the grain size of the largest desired final grain product.

The term "quantity" used in the present application, in the case of physical quantities, such as in particular the material to be processed and the already processed material, may denote a mass or a weight and/or a volume.

In an advantageous specific embodiment, a setpoint quantity variable may be assigned as a target variable to each value grain grading curve. The setpoint quantity variable may be a setpoint quantity portion of the total feed quantity or of the total quantity of processed material or may be a specified setpoint quantity in terms of mass or weight or volume, respectively per unit of time. The setpoint quantity variable may also be a setpoint quantity ratio of the quantities of value grain respectively delivered by two value grain grading curves per unit of time. If more than two value grain grading curves exist in the rock processing system, a setpoint quantity ratio may be specified as a target variable for each pair of value grain grading curves. Thus, the control unit may be advantageously designed to change at least one control operating parameter of at least one system component according to the detection signals and the at least one data relationship in such a way that the actual quantity variable of the respective value grain grading curve is within a predetermined tolerance range around the setpoint quantity variable respectively assigned to the value grain grading curve and/or that an actual quantity ratio of two different value grain grading curves is within a predetermined tolerance range around a setpoint quantity ratio.

The at least one target variable may be a set of target variables, of which the setpoint quantity variables of the respective value grain grading curves are only one target variable. Other target variables may include for example the energy consumption of the rock processing system per unit of time, the wear of system components, the grain shape or grain shape distribution obtained within one value grain grading curve and the like.

The rock processing system preferably includes at least one oversize grain return apparatus, which conveys an oversize grain screen fraction back into the material feeding apparatus or into an input area of a crushing apparatus of the rock processing system. Further preferably, the rock processing system has an oversize grain quantity sensor, which detects the quantity of oversize grain returned per unit of time in at least one of the at least one oversize grain return apparatus. The quantity of oversize grain conveyed per unit of time may be detected for example by a belt scale in an oversize grain conveyor belt or volumetrically by a camera and subsequent image processing.

An oversize grain data relationship may be stored in the data memory, which, by taking into consideration the at least one predetermined target variable or the at least one predetermined target variable range, sets the detection signals of the at least one oversize grain quantity sensor and/or a value derived from the detection signals of the at least one oversize grain quantity sensor quantitatively or qualitatively in relation to at least one control operating parameter and/or to at least one change of a control operating parameter of at least one system component. The control unit is preferably designed to change at least one control operating parameter of at least one system component according to the detection signals of the at least one oversize grain quantity sensor, of the at least one predetermined target variable or of the at least one predetermined target variable range and of the at least one oversize grain data relationship.

A target variable of the at least one predetermined target variable may be a setpoint oversize grain quantity variable, which indicates the quantity of oversize grain that is to be returned per unit of time. The control unit may then be designed to change at least one control operating parameter of at least one system component according to the detection signals of the at least one oversize grain quantity sensor and of the at least one oversize grain data relationship in such a way that an actual oversize grain quantity variable of at least one of the at least one oversize grain return apparatus is within a predetermined tolerance range around a setpoint oversize grain quantity variable.

Additionally or alternatively, however, a target variable may be, by way of example, the energy consumption of the rock processing system per unit of time and/or the obtained grain shape.

The setpoint oversize grain quantity variable itself may in turn be ascertained as a possible target variable by a data relationship in the data memory on the basis of input data of further sensors and/or data inputs.

In order to optimize its operation as extensively as possible, the rock processing system may comprise at least one of the following operation sensors for detecting at least one detection operating parameter associated with the respective operation sensor: at least one energy consumption sensor for detecting an energy consumption of the rock processing system and/or of one of its system components as the detection operating parameter associated with the energy consumption sensor; at least one throughput quantity sensor for detecting a throughput quantity of material processed by the rock processing system and/or one of its system components per unit of time as the detection operating parameter associated with the throughput quantity sensor; at least one crushing apparatus load sensor for detecting an operating load of at least one crushing apparatus of the at least one crushing apparatus as the detection operating parameter associated with the load sensor; at least one screening apparatus load sensor for detecting an operating load of at least one screening apparatus of the at least one screening apparatus as the detection operating parameter associated with the load sensor; at least one drive apparatus load sensor for detecting an operating load of at least one drive apparatus of the rock processing system as the detection operating parameter associated with the drive apparatus load sensor; an overload counter for detecting a number of overload cases of at least one system component occurring per unit of time as the detection operating parameter associated with the overload counter; a wear sensor for detecting a wear occurring on a system component as the detection operating parameter associated with the wear sensor; at least one material buffer fill ratio sensor for detecting a fill ratio of the material buffer as the detection operating parameter associated with the material buffer fill ratio sensor; at least one conveyor apparatus fill ratio sensor for detecting a fill ratio of at least one conveyor apparatus as the detection operating parameter associated with the conveyor apparatus fill ratio sensor; at least one conveyor apparatus conveying speed sensor for detecting a conveying speed of at least one conveyor apparatus as the detection operating parameter associated with the conveyor apparatus conveying speed sensor; at least one crushing apparatus fill ratio sensor for detecting a fill ratio of at least one crushing apparatus of the at least one crushing apparatus as the detection operating parameter associated with the crushing apparatus fill ratio sensor; and at least one crush gap sensor for detecting a dimension of a crush gap of at least one crushing apparatus of the at least one crushing apparatus as the detection operating parameter associated with the crush gap sensor.

The term "detection operating parameter" merely expresses that the respective operating parameter is directly or indirectly detectable by a sensor. A detection operating parameter may also be a control operating parameter and vice versa.

In principle, one sensor suffices for detecting an operating parameter. In this context, however, one and the same detection operating parameter may be detected by multiple sensors, for example if the fill ratio of the material buffer to be ascertained is not an average fill ratio, but rather a location-dependent local fill ratio. If more than one operating parameter is to be detected, the rock processing system may have more than one sensor. The same applies, if more than one physical operating principle is to be used for detecting one operating parameter or multiple operating parameters.

When using a combustion engine as the central power plant of the rock processing system, the energy consumption may be detected by a flow sensor for detecting a flow of fuel through a line supplying the combustion engine with fuel. On an electrical component, the energy consumption may be detected by detecting the current supplied to the electrical component and the voltage dropping on the electrical component over an operating time period. On an hydraulic component, the energy consumption may be detected by detecting a flow rate of a hydraulic fluid and the pressure of the hydraulic fluid over an operating time period.

The fill ratio of the material buffer may be detected for example by one or multiple ultrasonic sensors. Additionally or alternatively, an optical detection by at least one camera as sensor and/or a tactile detection by a mechanical sensor is possible.

The fill ratio of the material buffer may be represented by a fill level of the material fed into the material buffer. For this purpose, a single value of the fill level may be used as a representative value for an entire average fill level of the material buffer, or multiple local fill levels may be ascertained in order to increase the resolution of the filling of the material buffer. It is also conceivable, using optical methods such as laser scanning, to ascertain a profile of the surface of material fed into the material buffer and its height above the known bottom of the material buffer. The fill level or the local fill levels up to the surface profile of the infed material may already sufficiently represent the fill ratio. They may alternatively be set in relation to the maximum holding capacity of the material buffer.

In this context, an overfilled material buffer, in particular a feed hopper, is to be avoided as much as an underfilled material buffer. In the case of an overfilled material buffer, material is lost in the feeding process, because it can slide off a material heap in the material buffer and fall alongside the material feeding apparatus. Furthermore, the conveying capacity of the material buffer may deteriorate and the screening capacity of a pre-screen situated downstream from the material buffer may be influenced negatively when overloading the material buffer. Moreover, overfilling the material buffer may result in a pileup in a working unit, in particular in a crushing apparatus, downstream in the flow of material. An underfilled feed hopper may result in high stress on the conveyor apparatus connected to the material buffer, since material then strikes the conveyor apparatus directly during the feeding of material, which may cause increased wear and a higher noise emission.

As an alternative or preferably in addition to the fill ratio of the material buffer, the fill ratio of at least one conveyor apparatus may be detected as the or a relevant detection operating parameter. Preferred in this context is the detection of the fill ratio of a conveyor apparatus conveying material from the material buffer to a working unit, in particular to the crushing apparatus. For the conveying capacity of a conveyor apparatus conveying material directly from the material buffer influences both the fill ratio of the material buffer as well as the fill ratio of the working unit, in particular the crushing apparatus, to which it conveys material. The equivalent applies for detecting a conveying speed of at least one conveyor apparatus, which preferably is again the conveyor apparatus conveying material between the material buffer and the working unit, in particular the crushing apparatus.

The product of fill ratio and conveying speed of a conveyor apparatus provides a measure for the volume conveyed by the conveyor apparatus and thus a measure for the throughput quantity of material processed per unit of time by the rock processing system and/or one of its system components. A combination of sensors for detecting fill ratio and conveying speed of one and the same conveyor apparatus may thus be used as a throughput quantity sensor.

The conveyor apparatus may be a belt conveyor apparatus or a trough conveyor apparatus, the latter conveying preferably according to the micro throw principle as a vibrating conveyor. A vibrating conveyor, preferably in the form of a trough conveyor apparatus, is preferred especially as a conveyor apparatus for conveying material between the material buffer and a crushing apparatus. The rock processing system may also comprise a plurality of conveyor apparatuses and will normally comprise such a plurality, for example because one and the same conveyor apparatus is not able to convey material as a feed conveyor apparatus from the material buffer to a working unit and as a discharge conveyor apparatus away from a working unit and out of the rock processing system. In the case of a plurality of conveyor apparatuses, these may use different conveying principles, such as the micro throw principle in vibrating conveyors already described above and/or such as a belt conveyor, the belt conveyor being normally used as a discharge conveyor apparatus due to the smaller grain size occurring in the discharge and a usually more homogeneous grain size distribution.

A conveying speed of a conveyor apparatus may be ascertained in various ways. The conveying speed may be determined independently of the type of conveyor apparatus by detecting a motion in the conveying direction of a material lying on the conveyor apparatus, for example by a light barrier, by ultrasound, by optical detection and image processing and the like. A conveying speed of a belt conveyor may be detected by detecting the speed of a pulley cooperating with the conveyor belt, be it a support pulley or a drive pulley, or by directly detecting the track speed of the conveyor belt. In vibrating conveyors, the vibration amplitude and vibration frequency may be a measure for the speed of material supported on a vibrating conveyor, so that a detection of the vibration amplitude and of the vibration frequency is a detection of values of variables representing the conveying speed.

For all conveyor apparatuses, it is also the case that their conveying capacity is derivable from the drive power of a motor that drives them, so that the conveying capacity can be derived as the operating load of a motor as the drive apparatus indirectly from the detection of a motor torque and of a motor speed. For some types of electric motors, the output motor torque may be ascertained from the motor current drawn. For hydraulic motors, the output torque is proportional to the product of the pressure drop across the hydraulic motor and its displacement. Apart from that, it is possible to ascertain and store a torque characteristic map for any motor as a function of its control variables. From the detected control variables, the control unit is then able to ascertain the motor torque by retrieving the torque characteristic map.

As a further possible detection operating parameter, at least one sensor may detect the fill ratio of the crushing apparatus. This is meaningful especially in the case of jaw crushers and cone crushers, but should also not be disregarded for impact crushers and roll crushers. The fill ratio of a crushing apparatus has an influence on the wear of crushing tools, such as jaws, blow bars, impact bars, impact wings, crushing rollers and the like, as well as on the quality, in particular the grain shape, of the final grain product.

The fill ratio of a crushing apparatus may be detected by light barriers, by ultrasound and the like.

Additionally or alternatively, it is possible to detect the dimension of a crush gap, that is, in particular the gap width, of a crushing apparatus as a detection operating parameter. This applies in particular to jaw crushers and to impact crushers. In the case of an impact crusher, it is possible to detect in each case a dimension both of an upper as well as of a lower crush gap on an upper and respectively on a lower impact wing and/or the crush gap ratio of said crush gaps as the detection operating parameter. A detection of crush gap dimensions may be performed by detecting a position of an actuator element, which moves a movable component limiting the respective crush gap dimension, so that a position of the actuator element is unequivocally associated with a position of the movable component. Such a component may be a movable crusher jaw or an impact wing. A calibration may be stored in the aforementioned data memory, which links a detected position of the actuator element to a crush gap dimension.

Operating loads may also be detected sensorially as detection operating parameters, for example the operating load of a drive apparatus, such as a central drive unit of the rock processing system, which converts the energy supplied to it into one or multiple different alternative forms of energy. Such a drive apparatus may be an internal combustion engine, in particular a diesel engine, which converts the inherent calorific value of a fuel into mechanical or kinetic energy on an output shaft. An electric motor is also conceivable as such a drive apparatus, which converts the electrical energy supplied to it into mechanical or kinetic energy on an output shaft. The same applies to a hydraulic motor. In all cases, an operating load may be ascertained for example from a detection of the speed of the output shaft and a torque output at this speed. The detection of speed and torque of a shaft is sufficiently known in the prior art. As was explained above, on the basis of at least one further detection operating parameter, a motor torque may be retrieved from a torque characteristic map stored in the data memory, in which the motor torque is linked to the at least one further detection operating parameter.

Alternatively or additionally, the operating load of a crushing apparatus may be detected as a detection operating parameter. In the case of a crushing apparatus, regardless of the concrete type of crusher, there is always an input shaft, which supplies kinetic energy to a movable part of the crushing apparatus, such as the movable crusher jaw of a jaw crusher, the rotor of an impact crusher or the cone of a cone crusher. Here too, the operating load may be ascertained from the speed of the input shaft and the torque output at the respectively detected speed. The torque of the input shaft is the torque of a machine driving the input shaft, possibly converted by at least one gear situated between the driving machine and the input shaft.

Alternatively or additionally, the operating load—operating load in the broadest sense—of a screening apparatus may be detected as a detection operating parameter. Since the screening apparatus as a vibrating screening apparatus functions in a similar manner as a vibrating conveyor, the operating load of the screening apparatus may be represented by an amplitude and/or a frequency of a periodic screening movement. Additionally or alternatively, a throw angle produced by the periodic screening movement may be taken into consideration as an influence parameter of the operating load of a screening apparatus. The screening apparatus is also driven to perform its periodic movement by a drive shaft. The speed of the drive shaft, possibly with the additional consideration of the torque delivered at a detected speed, is likewise an indicator of the operating load of a screening apparatus. Thus, a screening apparatus load sensor for a detecting the operating load of the screening apparatus is able to detect the motion amplitude and/or the motion frequency and/or a throw angle of the screening apparatus and/or a speed and/or a torque of the drive shaft of the respective screening apparatus as the operating load of the latter.

An overload counter may use at least one previously described load sensor, such as a crushing apparatus load sensor, screening apparatus load sensor and drive apparatus load sensor, or its detection outputs and compare this to predetermined load thresholds stored in the data memory. For every exceedance of a predetermined load threshold, the overload counter can incrementally increase a count value for the respective load. The overload counter can combine all overload cases occurring in the rock processing system into one count value or it can keep a collective count value for a group of system components and keep for one or multiple dedicated system components respectively one individual count value or it can keep one individual count value for every system component that is of interest.

A wear sensor may be formed by integrating a sensor into the wearing component, for example in such a way that an electrically conductive circuit is situated at a predetermined wear limit in such a way that it is destroyed when the wear limit is reached. The loss of conductivity may be readily detected. If multiple of these wear sensors are situated at different wear locations of a wearing component, in particular of a crushing tool of a crushing apparatus, it is possible to monitor a wear progress on the respective wearing component as a function of the damage incident respectively triggered by the destruction of the circuit.

An operating parameter data relationship may be stored in the data memory, which, by taking into consideration the at least one predetermined target variable or the at least one predetermined target variable range, sets the detection signals of the at least one operation sensor and/or a value derived from the detection signals of the at least one operation sensor quantitatively or qualitatively in relation to at least one control operating parameter and/or to at least one change of a control operating parameter of at least one system component. The control unit is preferably designed to change at least one control operating parameter of at least one system component according to the detection signals of the at least one operation sensor, of the at least one predetermined target variable or of the at least one predetermined target variable range and of the at least one operating parameter data relationship.

According to a preferred development of the present invention, a setpoint value of the at least one detection operating parameter may be at least one target variable of the at least one predetermined target variable. The control unit may be designed to change at least one control operating parameter of at least one system component according to the detection signals of the at least one operation sensor and of the at least one operating parameter data relationship in such a way that an actual value of at least one detection operating parameter is within a predetermined tolerance range around the setpoint value of the at least one detection operating parameter.

Equipment information about the type and the equipment of the rock processing system, in particular of the respective rock processing apparatus, may be stored in the data memory. Thus, for example, information about the occupancy of the at least one screening apparatus and/or about the crushing tools installed in the at least one crushing apparatus may be stored in the data memory. Equipment information about preferably multiple, particular preferably every, system component may be stored in the data memory. The aforementioned at least one data relationship stored in the data memory is preferably a plurality of data relationships. From the multiple data relationships, the control unit may select one or a subgroup of a plurality of data relationships as a function of the equipment information. This ensures that the operation of the rock processing system can be controlled or regulated in a manner suitable for the respective system state.

Apart from the operating parameters, with which the rock processing system is operated, the material fed into the rock processing system also has an influence on the final grain product and on the operating settings of the rock processing system. For taking the fed material and its properties into consideration, the rock processing system according to an advantageous development may comprise at least one material sensor for detecting at least one of the following material parameters relating to the fed material: type of the fed material; humidity of the fed material; density of the fed material; hardness of the fed material; crushability of the fed material; abrasiveness of the fed material; state of the fed material; grain size of the fed material; grain size distribution of the fed material; grain shape of the fed material; quantity of the fed material; and proportion of, in particular non-crushable, foreign material in the fed material.

An influential operating parameter is the type of material fed into the rock processing apparatus and conveyed and processed by the latter. The type of material to be processed may be determined by one or multiple qualitative parameters and/or by one or multiple quantitative parameters. According to a classification defined in advance, a qualitative parameter may include for example “hard rock”, “soft rock”, “reinforced concrete”, “milled asphalt material”, “asphalt clod”, “demolition rubble”, “gravel”, “railroad ballast” and/or “other”.

A quantitative parameter may comprise values determined according to recognized and preferably standardized measuring methods, for example, for density and/or hardness and/or crushability and/or abrasiveness and/or moisture of the fed or conveyed material. According to a classification defined in advance, these parameters may also be determined qualitatively, in particular only qualitatively. For example, parameters may have the qualitative contents “hard”, “medium hard”, “soft”, “good crushability”, “average crushability”, “poor crushability”, “little moisture”, “average moisture”, “high moisture”, etc. The qualitative gradation may comprise more than three grades.

The density may be determined quantitatively for example from an optical volume measurement and simultaneous weighing, for example by a scale integrated in the conveyor apparatus. The moisture of the material may be ascertained by a corresponding moisture sensor. The abrasiveness may be determined by an LCPC test. The crushability of a material may be determined in parallel to the abrasiveness during the LCPC test or may be determined as a Los Angeles value in accordance with DIN EN 1097-2 in the respectively currently valid version.

If the composition of the fed rock is known, then the control unit in response to the input of the respective type of rock via an input device is able to read out corresponding material values, such as hardness, density, abrasiveness and crushability, from a table stored in the aforementioned data memory. In principle, it is also possible, however, to irradiate the fed material with energy-rich electromagnetic radiation, for example X-ray radiation, and to detect the irradiation response of the material and to draw inferences about the composition of the material and its properties and material characteristic values from the detected irradiation response, on the basis of data relationships stored in the data memory. Additionally or alternatively, it is possible to detect the fed material through image processing and to ascertain the type of material for example by way of an artificial intelligence module trained for this purpose.

Grain shapes and/or grain sizes and/or grain size distributions and/or the proportion of foreign material may be detected by image processing, for example. Especially the grain size distribution is a determining factor influencing the result of pre-screening, which in turn influences the quality of a downstream crushing apparatus and consequently the amount of accruing oversize grain. Grain shapes and/or grain sizes and/or grain size distributions may be detected qualitatively and/or quantitatively. Foreign material is in particular non-crushable material, such as plastic, wood, steel and the like. These foreign materials may interfere with the operational sequence of a rock processing system.

The state of the material may be classified for example as precrushed and non-precrushed, “precrushed” denoting prior crushing by a rock processing apparatus. Precrushed material may be oversize grain returned in the same rock processing apparatus. Additionally or alternatively, precrushed material may be transferred to the respective rock processing machine from another rock processing apparatus situated upstream in the flow of material. In the case of mixtures of precrushed and non-precrushed material, the state of the material may be indicated by a mixture ratio, in particular a mass-related mixture ratio, of precrushed and non-precrushed material. The state of the material may in principle be detected by image processing like the grain shape, for example. Additionally or alternatively, the state may be transmitted to the control unit via data transmission by conveying means conveying precrushed and/or non-precrushed material for processing by the respective rock processing apparatus. With the aid of conveying means scales, such as belt scales or bucket scales for example, the respective conveying means is able additionally to transmit quantity information about the material of the respective state.

A material parameter data relationship may be stored in the data memory, which, by taking into consideration the at least one predetermined target variable or the at least one predetermined target variable range, sets the detection signals of the at least one operation sensor and/or a value derived from the detection signals of the at least one operation sensor quantitatively or qualitatively in relation to at least one control operating parameter and/or to at least one change of a control operating parameter of at least one system component, wherein the control unit is designed to change at least one control operating parameter of at least one system component according to the detection signals of the at least one operation sensor, of the at least one predetermined target variable or of the at least one predetermined target variable range and of the at least one operating parameter data relationship.

The at least one control operating parameter may be one operating parameter or may preferably be multiple different operating parameters, in order suitably to adjust the rock processing system as specifically as possible to its respective operating situation. Possible control operating parameters were already mentioned above in the explanation of possible sensors and the operation of the rock processing system. In a preferably far-reaching specific embodiment, the at least one control operating parameter may comprise at least one of the following operating parameters: conveying capacity of a conveyor apparatus conveying material to the crushing apparatus; amplitude of a pre-screen excitation; frequency of a pre-screen excitation; crush gap width; speed of a crushing rotor; setpoint fill ratio of the crushing apparatus; amplitude of a post-screen excitation; frequency of a post-screen excitation.

Fundamentally, it is of course preferred, if the rock processing system is designed to detect parameters helpful for adjusting its operation by way of sensors. Certain operating parameters, however, can be detected sensorially only with great effort, in particular parameters relating to the fed material, such as abrasiveness, crushability and, if applicable, also the density of the material. To be able to provide the control unit also with such parameters that are difficult to access sensorially, the rock processing system preferably comprises an input device already mentioned above for inputting at least one input parameter. The term "input parameter" also comprises the parameters already mentioned above, the term being merely intended to express that the respective parameter was not sensorially detected, in contrast to a detection operating parameter, but was input via the input device.

The input device is preferably connected to the control unit in signal-transmitting fashion for transmitting information, so that the control unit is able to use the information input into the input device for further information processing.

The input device may be any input device, such as a keyboard, a touchscreen and the like. The input device may also be connected to the control unit in signal-transmitting fashion via a cable link or a radio link, so that it is not necessary for it to be physically present at the rock processing system. A signal-transmitting connection of the input device or of the at least one sensor to the control unit may also be a connection by interposition of the data memory, in which pieces of information input into the input device and/or pieces of information output by the at least one sensor for detecting the at least one operating parameter are stored as data and are retrieved as stored data by the control unit.

An input parameter data relationship is preferably stored in the data memory, which, by taking into consideration the at least one predetermined target variable or the at least one predetermined target variable range, sets the at least one input parameter and/or a value derived from the at least one input parameter qualitatively and/or quantitatively in relation to at least one control operating parameter and/or to at least one change of a control operating parameter of at least one system component. In principle, what was said above about other operating parameters and the data relationships respectively concerning these operating parameters applies accordingly to the at least one input parameter and the input parameter data relationship. For the control unit, it is first of all decisive only that a specific operating parameter exists quantitatively or qualitatively and is usable for further information processing. The origin of the operating parameter, whether it was detected by sensor or was input into the input device, is irrelevant for the further information processing. This applies in particular to the use of the at least one operating parameter as input datum of a data relationship assigning further values to the operating parameter.

The terminological distinctions in the designation of data relationships, such as oversize grain data relationship, operating parameter data relationship, material parameter data relationship and input parameter data relationship, are merely intended to indicate that the designated data relationship links the respective parameter quantitatively and/or qualitatively to other parameters. The different designations are not intended to indicate that these are necessarily separate data relationships. A multidimensional data relationship may link both operating parameters as well as material parameters, regardless of their respective source as sensorially detected parameters or as input parameters, to one or multiple control parameters. The data relationship mentioned at the outset may then also be an oversize grain data relationship and likewise an operating parameter data relationship, material parameter data relationship and input parameter data relationship. It is not to be ruled out, however, that some operating parameters and/or material parameters are linked quantitatively or qualitatively to control operating parameters via a single multidimensional data relationship and that at least one other operating parameter and/or material parameter is linked quantitatively and/or qualitatively to control operating parameter via a separate data relationship. The latter may be the case in particular if the input data of the separate data relationship are without any causal relationship with the input data of the multidimensional data relationship.

Although it was already explained that an input parameter may be any of the aforementioned operating parameters and/or material parameters and/or oversize grain quantity variable, which may also be detected sensorially, it is explained below for better clarity that at least one input parameter of the at least one input parameter may be one of the following parameters: quantity of oversize grain returned per unit of time; energy consumption of the rock processing system and/or of one of its system components; throughput quantity of material processed by the rock processing system and/or by one of its system components per unit of time; operating load of at least one crushing apparatus of the at least one crushing apparatus; operating load of at least one drive apparatus of the rock processing system; number of overload cases of at least one system component occurring per unit of time; wear occurring on a system component per unit of time; fill ratio of at least one conveyor apparatus; conveying speed of at least one conveyor apparatus; fill ratio of at least one crushing apparatus; dimension of a crush gap of at least one crushing apparatus of the at least one crushing apparatus; type of the fed material; hardness of the fed material; crushability of the fed material; abrasiveness of the fed material; grain size of the fed material; grain size distribution of the fed material; quantity of the fed material.

Any sensor capable of detecting a volume and/or a weight and/or a mass of discharged value grain may be used as the aforementioned quantity sensor. The at least one quantity sensor may comprise for example at least one of the following sensors: at least one conveyor belt scale for ascertaining a weight of a material quantity fed onto a conveyor belt of the conveyor apparatus; at least one stockpile sensor for detecting a stockpile parameter, comprising a height and/or a shape and/or a volume of a stockpile, and/or for detecting a rate of change over time of the stockpile parameter.

In a manner known per se, the conveyor belt scale can be used to detect a material quantity transported per unit of time on a conveyor belt as mass or weight per unit of time. The conveyor belt scale is preferably situated in at least one of the discharge conveyor apparatuses.

The detection signal of the at least one stockpile sensor may represent a state of the stockpile, in particular a state of the size and/or shape of the stockpile. The size of the stockpile may be represented by its height above the ground that supports it or by parameter values from which this height can be inferred. By detecting a state of the shape of the stockpile, it is also possible to infer its size, for example, in the case of a frequently conical stockpile, by knowing the diameter of its base resting on the ground that supports it and the inclination of its lateral surface relative to the ground or of the angle of the cone. Preferably, the stockpile sensor is able to detect the shape of the stockpile in such sufficient manner that a volume of the stockpile may be ascertained from the detection signals of the stockpile sensor with sufficient accuracy. If one assumes a conical stockpile, for example, which is normally the prevailing shape of a heaped stockpile, it is possible to calculate the stockpile volume from the base area occupied by the stockpile and its height and/or the inclination of its lateral surface lines forming the contour for an imaging sensor. Since normally the grain size or even the grain size distribution of the final grain product heaped in the stockpile is known or is sensorially detectable, it is possible to infer the bulk density of the stockpile from the ascertained volume of the stockpile by taking into consideration the known grain size and/or grain size distribution. Starting from the net stockpile volume ascertained from the stockpile volume and its bulk density, it is possible to infer the net stockpile mass based on the density of the processed material. The net stockpile masses of the stockpiles forming below the discharge conveyor apparatuses of the respective value grain grading curves represent an actual quantity variable of the value grain grading curve associated with the respective stockpile. Thus, it is possible to ascertain an actual quantity variable for every stockpile of a value grain grading curve. From the actual quantity variables, it is possible to form an actual quantity ratio for respectively two stockpiles of the totality of existing stockpiles of value grain grading curves.

To ascertain the stockpile shape, the at least one stockpile sensor can detect at least one shape dimension of the stockpile as the at least one stockpile parameter. Possible shape dimensions are the previously mentioned parameters: height of the stockpile, diameter or generally characteristic dimension of the stockpile base and/or surface area of the stockpile base, angle of inclination of the lateral surface of the stockpile extending from the stockpile base to a stockpile top situated at the remote end of the stockpile in the vertical direction. The control unit is then designed to ascertain a height of a stockpile top on the basis of the at least one detected shape dimension.

The rock processing apparatus preferably comprises a time measuring device, which is connected in signal-transmitting fashion to the control unit, possibly by interposition of the data memory. The or a time measuring device may be integrated in at least one of the aforementioned sensors and/or in the input device and/or in the control unit. Via signals of the time measuring device, the control unit is able to assign an event time to detection events of at least one sensor and/or input events of at least one input device. From the time interval of at least two event times for an event of the same kind, for example the detection of one and the same stockpile parameter or one and the same operating parameter, the control unit is able to determine a rate of change associated with the respective events. Thus, from two detections of the stockpile height or generally of a state of the stockpile size and/or of the stockpile shape and the known time interval between these detection events, the control unit is able to ascertain a rate of change of the stockpile size and/or of the stockpile shape. This is an example of an ascertainment of a change over time of the height of the top of the stockpile as a growth parameter of the stockpile.

From the ascertained growth parameter and a state of the stockpile size and/or the stockpile shape known by detection, the control unit is able to predict, for example by extrapolation, a further quantitative development of the respective stockpile and is able to adjust the control operating parameter sufficiently early according to the predicted development of the respective stockpiles that the stockpiles develop quantitatively, individually and in relation to one another, in the desired manner.

In addition to the state of the size and/or of the shape of the stockpile, a fill ratio of the discharge conveyor apparatus building up the respective stockpile may be detected by at least one operation sensor as a relevant operating parameter of the rock processing system. For the conveying capacity of the discharge conveyor apparatus influences the stockpile growth directly. By detecting the fill ratio of the discharge conveyor apparatus stacking the respective stockpile, the control unit is able to check the at least one ascertained stockpile parameter for plausibility or even correct it. The same applies to the detection of a conveying speed of the discharge conveyor apparatus, which builds up the respective stockpile by its conveying operation.

With regard to the applied physical operating principle, the at least one stockpile sensor may comprise a sensor operating according to a reflection principle, such as an ultrasonic sensor or a radar sensor, and/or the at least one stockpile sensor may comprise an optical camera with subsequent image processing.

The rock processing system may be a single rock processing apparatus including a material feeding apparatus, the mentioned working units, at least one conveyor apparatus for conveying material between system components, at least two discharge conveyor apparatuses, the mentioned sensor system and the mentioned control unit. This rock processing apparatus is preferably a mobile rock processing apparatus having a travel gear, which allows the rock processing apparatus to change its place of installation in self-propelled fashion and/or to move in self-propelled fashion between a place of installation for a rock processing operation and a transport means for transporting the rock processing apparatus. Because of the normally high weight of the mobile, in particular self-propelled, rock processing apparatus, the travel gear is usually a crawler travel gear, although a wheel travel gear is not to be ruled out as an alternative or addition to a crawler travel gear.

The rock processing system may also comprise a plurality of such, in particular mobile, rock processing apparatuses, which cooperate in interlinked fashion in such a way that one rock processing apparatus upstream in the flow of material charges the material feeding apparatus of a further rock processing apparatus downstream by way of a discharge conveyor apparatus.

The crushing apparatus may be any known crushing apparatus, for example an impact crusher or a jaw crusher or a cone crusher or a roll crusher. If the rock processing system has more than one crushing apparatus, these crushing apparatuses may be crushing apparatuses of the same kind or of different kinds. Each individual crushing apparatus may be one of the aforementioned crusher types: impact crusher, jaw crusher, cone crusher and roll crusher.

The rock processing system described above can be deployed at any location where material to be processed is produced or provided, such as at rock quarries, gravel pits, building demolition sites, recycling yards and the like. The term "mineral material" therefore includes both natural mineral material as well as mineral material produced by processing. The latter includes building materials as well as returned oversize grain.

BRIEF DESCRIPTION OF THE SEVERAL VIEWS OF THE DRAWINGS

The invention will be explained in greater detail below with reference to the enclosed drawings.

DETAILED DESCRIPTION

Figure 1:
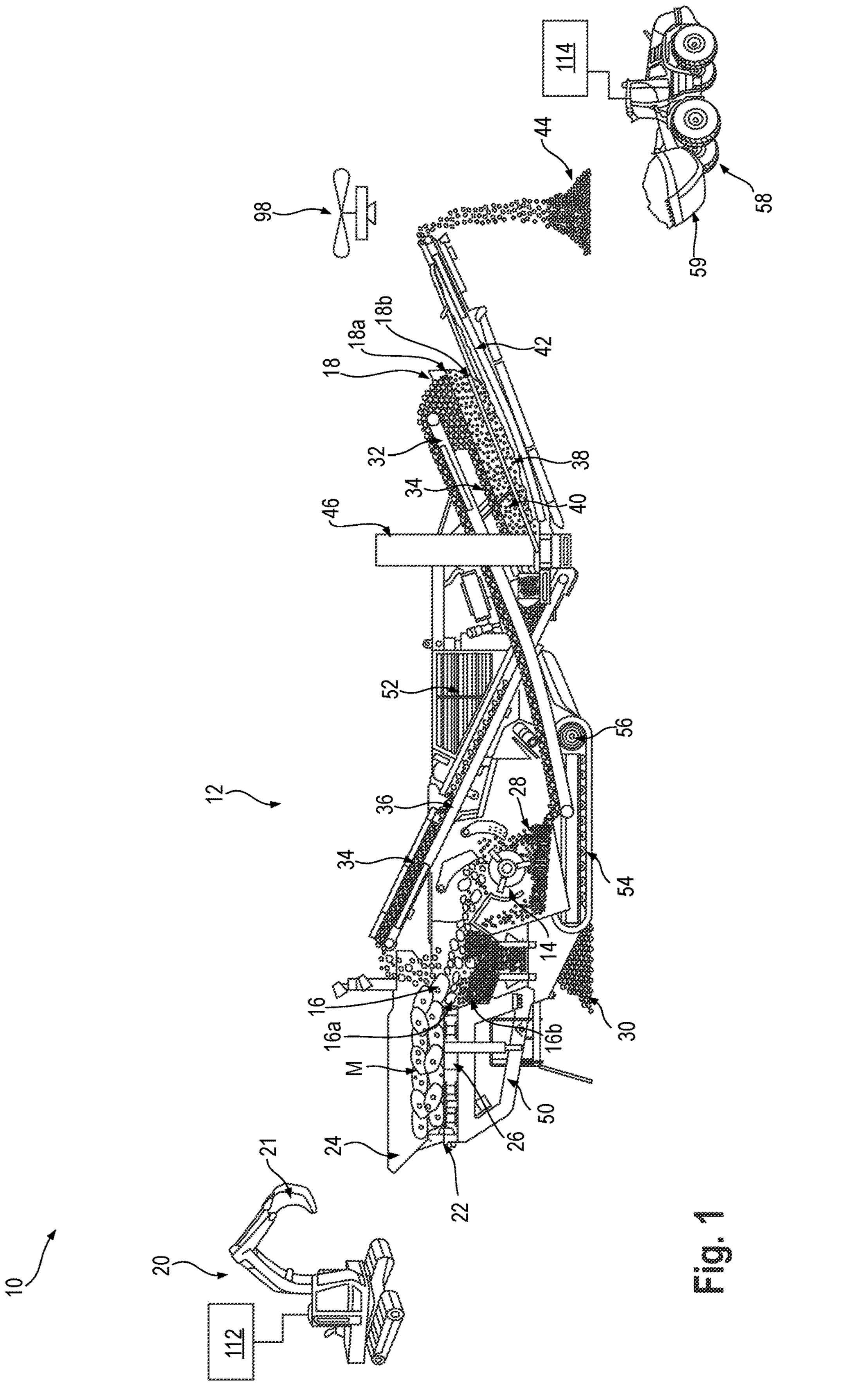
FIG. 1 shows a rough schematic view of a job site with a specific embodiment of a rock processing apparatus according to the present disclosure.

A job site is generally denoted by 10 in FIG. 1. The central implement of the job site 10 is a rock processing apparatus 12 comprising an impact crusher 14 as a crushing apparatus and a pre-screen 16 as well as a post-screen 18 as screening apparatuses. The job site is in the present case preferably a rock quarry but may also be a recycling yard or a demolition site of one or multiple buildings.

Material M to be processed by the rock processing apparatus 12, that is, to be sorted according to size and to be crushed, is fed discontinuously by being loaded by a backhoe 20 as a loading apparatus of the rock processing apparatus 12 into a material feeding apparatus 22 having a funnel-shaped material buffer 24.

From the material feeding apparatus 22, a vibrating conveyor in the form of a trough conveyor 26 conveys the material M to the pre-screen 16, which comprises two pre-screen decks 16*a* and 16*b*, of which the upper pre-screen deck 16*a* has a greater mesh aperture and separates and feeds to the impact crusher 14 those grain sizes that require crushing according to the respective specifications for the final grain product to be obtained.

Grains falling through the upper pre-screen deck 16*a* are sorted further by the lower pre-screen deck 16*b* into a usable grain fraction 28, which corresponds to the specifications of the final grain product to be obtained and an undersize grain fraction 30, which has a grain size that is so small that it is unusable as value grain.

The number of stockpiles or fractions shown in the exemplary embodiment is provided merely by way of example. The number may be greater or smaller than indicated in the example. Moreover, the undersize grain fraction 30 explained in the present example as waste could also be a value grain fraction if the grain size range accruing in the fraction 30 is usable for further applications.

The usable grain fraction 28 is increased by the crushed material output by the impact crusher 14 and is conveyed to the post-screen 18 by a first conveyor apparatus 32 in the form of a belt conveyor. In the illustrated exemplary embodiment, the post-screen 18 also has two screen decks or post-screen decks 18*a* and 18*b*, of which the upper post-screen deck 18*a* has the greater mesh aperture. The upper post-screen deck 18*a* allows value grain to fall through its mesh and sorts out an oversize grain fraction 34 having a grain size that is greater than the greatest desired grain size of the value grain. The oversize grain fraction 34 is returned by an oversize grain conveyor apparatus 36 into the material input of the impact crusher 14 or into the pre-screen 16. In the illustrated exemplary embodiment, the oversize grain conveyor apparatus 36 takes the form of a belt conveyor.

The useful grain of the useful grain fraction 28 thus comprises oversize grain and value grain. In contrast to the illustration in the exemplary embodiment, the oversize grain conveyor apparatus 36 may also be swiveled outward from a machine frame 50 of the rock processing apparatus 12, so that the oversize grain fraction 34 is stockpiled instead of being returned.

The value grain that fell through the meshes of the upper post-screen deck 18*a* is fractionated further by the lower post-screen deck 18*b* into a fine grain fraction 38 having a smaller grain size and a medium grain fraction 40 having a greater grain size.

Via a fine grain discharge conveyor apparatus 42 in the form of a belt conveyor, the fine grain fraction 38 is heaped to build a fine grain stockpile 44.

Figure 2:
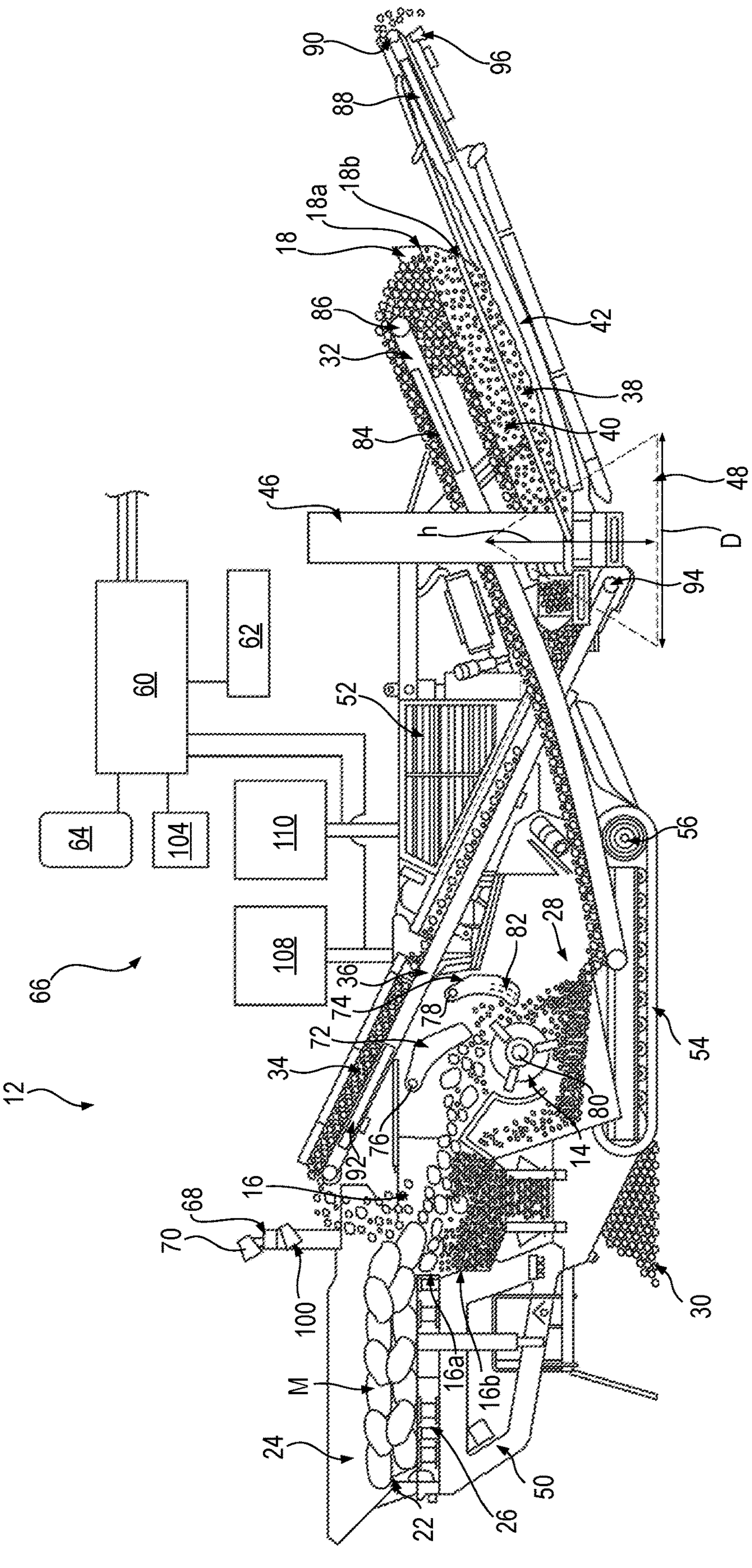
FIG. 2 shows the rock processing apparatus of FIG. 1 in an enlarged schematic lateral view.

Via a medium grain discharge conveyor apparatus 46, likewise in the form of a belt conveyor, the medium grain fraction 40 is heaped to build a medium grain stockpile 48 (not shown in FIG. 1 and shown only in rough schematic fashion in FIG. 2).

As a central structure, the rock processing apparatus 12 has a machine frame 50, on which the mentioned apparatus components are fastened or supported directly or indirectly. As central power source, the rock processing apparatus 12 has a diesel combustion engine 52 supported on the machine frame 50, which generates the entire energy consumed by the rock processing apparatus 12, unless it is stored in energy stores such as batteries, for example. Additionally, the rock processing apparatus 12 may be connected to job site electrical current, if provided on the job site.

In the illustrated example, the rock processing apparatus 12, which may be part of a rock processing system having a plurality of rock processing apparatuses situated in a common flow of material, is a mobile, more precisely a self-propelled, rock processing apparatus 12 having a crawler travel gear 54, which via hydraulic motors 56 as drive of the rock processing apparatus 12 allows for a self-propelled change of location without an external towing vehicle.

A reduction of the value grain stockpiles 44 and 48 and of the stockpile of the undersize grain fraction 30 occurs discontinuously by one or several wheel loaders 58 as an example of a removal apparatus. The stockpile of the undersize grain fraction 30 must also be reduced regularly in order to ensure an uninterrupted operation of the rock processing apparatus 12.

For an operational control that is as advantageous as possible the rock processing apparatus 12 may include, with reference to the larger illustration of FIG. 2, a control unit 60, for example in the form of an electronic data processing system with integrated circuits, which controls the operation of apparatus components. For this purpose, the control unit 60 may either control drives of apparatus components directly, for example, or may control actuators which in turn are able to move components.

The control unit 60 is connected to a data memory 62 in signal-transmitting fashion for exchanging data and is connected to an input device 64 for inputting information. Via the input device 64, for example a touchscreen, a tablet computer, a keyboard and the like, information may be input into the input device 64 and may be stored by the latter in the data memory 62.

The control unit 60 is furthermore connected in signal-transmitting fashion to an output device 66 in order to output information.

For obtaining information about its operating state, the rock processing apparatus 12 furthermore has diverse sensors, which are connected in signal-transmitting fashion to the control unit 60 and thus in the illustrated example indirectly to the data memory 62. For better clarity, the sensors are shown only in FIG. 2.

A camera 70 is situated on a supporting frame 68, which records images of the material feeding apparatus 22 with the material buffer 24 and transmits these to the control unit for image processing. With the aid of camera 70 and by processing the images it records of the material buffer 24 and of the material feeding apparatus 22, the control unit ascertains a local fill ratio of the material buffer 24 by using data relationships stored in the data memory 22.

Furthermore, a vibration amplitude and vibration frequency of the drive (not shown) of the trough conveyor 26 are detected and transmitted to the control unit 60, which ascertains from this information a conveying speed of the trough conveyor 26 and ascertains a conveying capacity of the trough conveyor 26 toward the impact crusher 14 by considering the local fill ratio of the material buffer 24.

With the aid of predetermined data relationships, generated and/or developed by methods of artificial intelligence, the control unit 60 is able to detect from image information of camera 70 a grain size distribution in the material M in the material buffer 24 and even detect the type of material.

In impact crusher 14, an upper impact wing 72 and a lower impact wing 74 are situated in a manner known per se, the rotational position of the upper impact wing 72 being detected by a rotational position sensor 76 and the rotational position of the lower impact wing 74 being detected by a rotational position sensor 78 and being transmitted to the control unit 60. Via the rotational position sensors 76 and 78, the control unit 60 is also able to ascertain a crush gap width of an upper crush gap on the upper impact wing 72 and a crush gap width of a lower crush gap on the lower impact wing 74.

A speed sensor 80 ascertains the speed of the crushing rotor of the impact crusher 14 and transmits it to the control unit 60.

On components such as blow bars, impact wings, impact plates and impact bars, for example, which are particularly subject to wear, wear sensors may be provided which register wear progress, normally in wear stages, and transmit this to the control unit 60. In the illustrated example, for better clarity, a wear sensor system 82 is shown only on the lower impact wing 74.

In the first conveyor apparatus 32, a first belt scale 84 is situated, which detects the weight or the mass of the material of the useful grain fraction 28 transported across it on the first conveyor apparatus 32. Via a speed sensor 86 in a deflection pulley of the conveyor belt of the first conveyor apparatus 32, the control unit 60 is able to ascertain a conveying speed of the first conveyor apparatus 32 and in joint consideration with the detection signals of the first belt scale 84 is able to ascertain a conveying capacity of the first conveyor apparatus 32.

A second belt scale 88 is situated in the fine grain discharge conveyor apparatus 42 and detects the mass or the weight of the fine grain of the fine grain fraction 38 moved across it on the belt of the fine grain discharge conveyor apparatus 42. In the same way, via the speed sensor 90 in a deflection pulley of the conveyor belt of the fine grain discharge conveyor apparatus 42, a conveying speed of the fine grain discharge conveyor apparatus 42 and in joint consideration with the detection signals of the second belt scale 88, a conveying capacity of the fine grain discharge conveyor apparatus 42 can be ascertained by the control unit 60.

A third belt scale 92 is situated in the oversize grain conveyor apparatus 36 and ascertains the weight or the mass of the oversize grain of the oversize grain fraction 34 conveyed across it on the oversize grain conveyor apparatus 36. A speed sensor 94 of a deflection pulley of the conveyor belt of the oversize grain conveyor apparatus 36 ascertains the conveying speed of the oversize grain conveyor apparatus 36 and transmits it to the control unit 60, which in joint consideration with the detection signals of the third belt scale 92 is able to ascertain a conveying capacity of the oversize grain conveyor apparatus.

Figure 3:
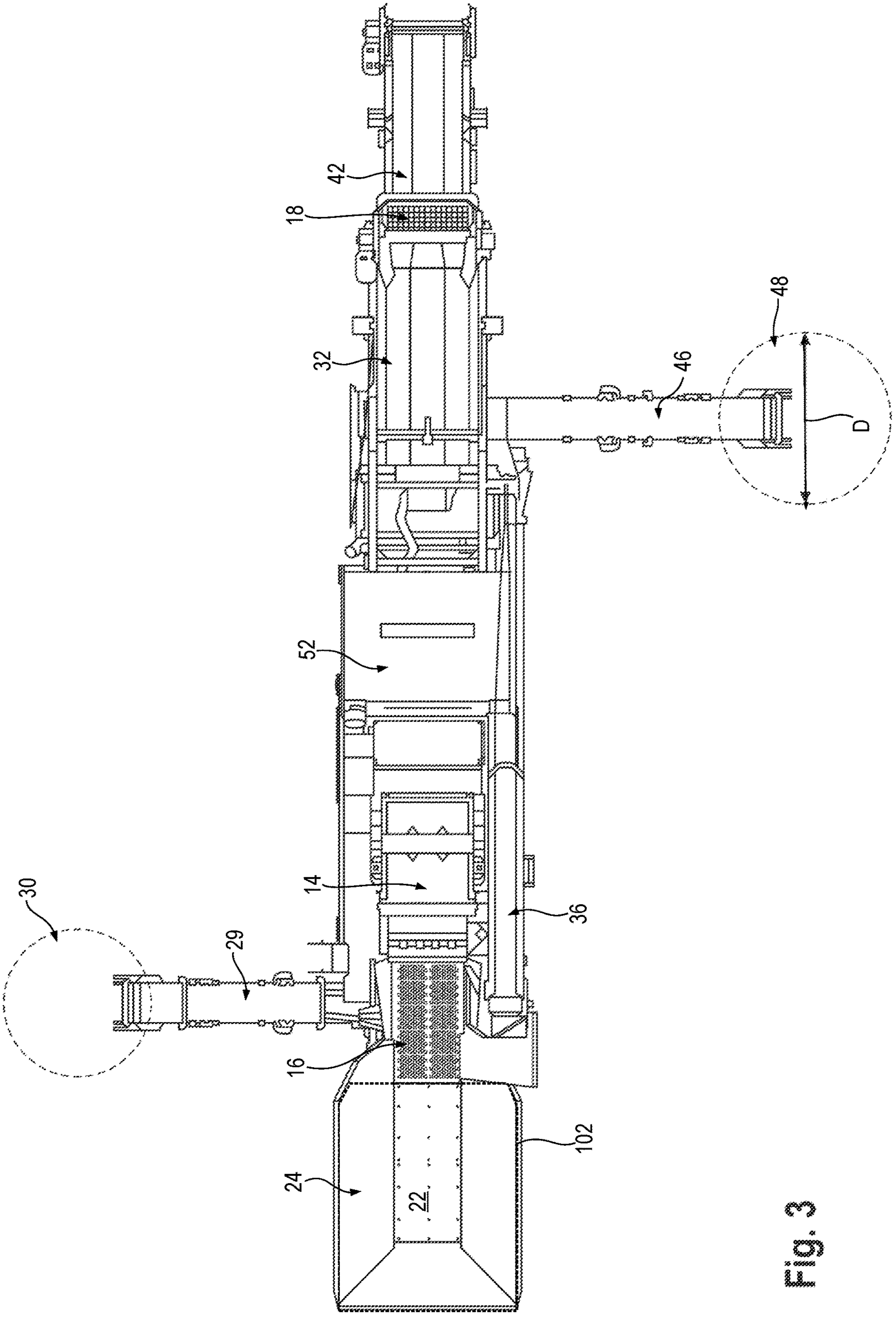
FIG. 3 shows the rock processing apparatus of FIG. 2 in an enlarged schematic top view.

At the discharge-side longitudinal end of the fine grain discharge conveyor apparatus 42, a first stockpile sensor 96 is situated, which as a camera records images of the fine grain stockpile 44 and transmits these as image information to a control unit 60, which detects contours of the fine grain stockpile 48 by image processing and on the basis of the known image data of the camera of the first stockpile sensor 96 starting from the detected contours ascertains a shape and from that a volume of the fine grain stockpile 48. For this purpose, to simplify its information ascertainment, the control unit 60 may assume an ideal conical shape of the fine grain stockpile 48 and ascertain the volume of an ideal cone approximating the real fine grain stockpile 48 without excessive error. Thus, it may suffice if a stockpile sensor ascertains the diameter D of the base area of a stockpile and the height h of the stockpile, as is shown in FIGS. 2 and 3 in the example of stockpile 48.

FIG. 1 shows a second stockpile sensor 98 that can be used alternatively or additionally. The second stockpile sensor 98 comprises a drone capable of flying as a carrier, which may be remote controlled in its movement by control unit 60. The second stockpile sensor 98 is also used to ascertain at least a height of the fine grain stockpile 48, preferably, however, to ascertain its shape and thus its volume. An advantage of using a drone or a sensor installed at an elevated location, for example on a high mast or post, is that one sensor is able to detect more than one stockpile with respect to its height and/or its shape and/or its volume. A number of sensors that is lower than the number of stockpiles to be detected at the rock processing apparatus 12, at a rock processing system or at the job site 10 may then suffice in order to detect every one of the stockpiles to be detected. Preferably, exactly one sensor will then suffice in order to detect all of the stockpiles to be detected.

Each discharge conveyor apparatus producing a stockpile preferably has at least one stockpile sensor or cooperates with a stockpile sensor.

The other discharge conveyor apparatuses, such as the medium grain discharge apparatus 46 and an undersize grain discharge apparatus 29, preferably also have belt scale and a speed sensor for detecting the quantity of material transported on the respective conveyor apparatus, the conveying speed and hence the conveying capacity.

The output device 66 may have a projection device 100, for example on the supporting frame 68, in order to project a marker within the overall feed area 102 shown in FIG. 2, which is identical with the feed opening of the material buffer 24. The overall feed area 102 is chosen is such a way that a grain falling along the direction of the force of gravity reaches the material feeding apparatus 22 without falling directly onto the pre-screen 16.

Figure 5:
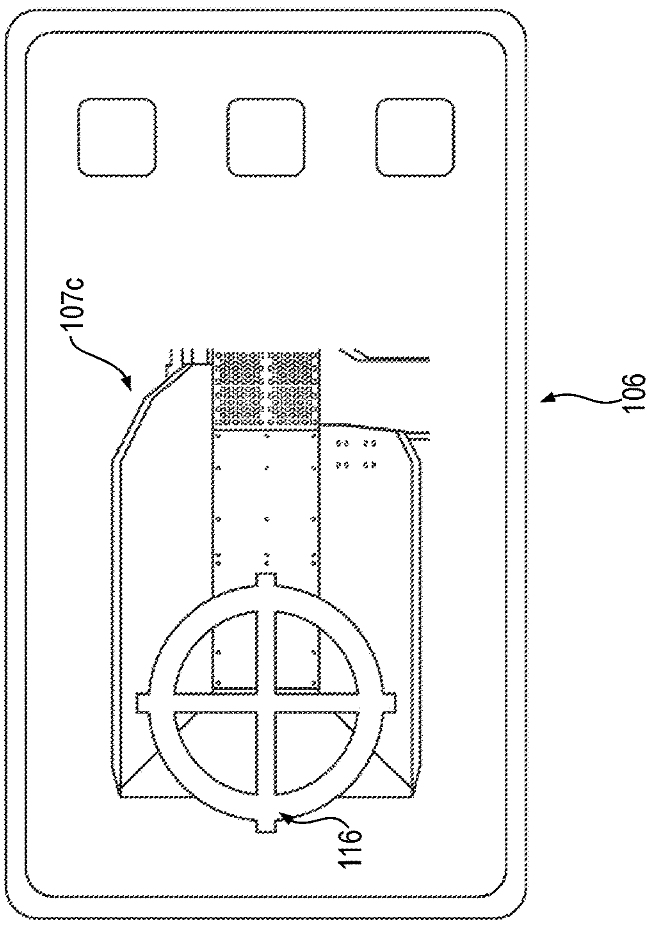
FIG. 5 shows a rough schematic view of a receiving device for outputting location information for a material feed to a material feeding apparatus of the rock processing apparatus.
Figure 4:
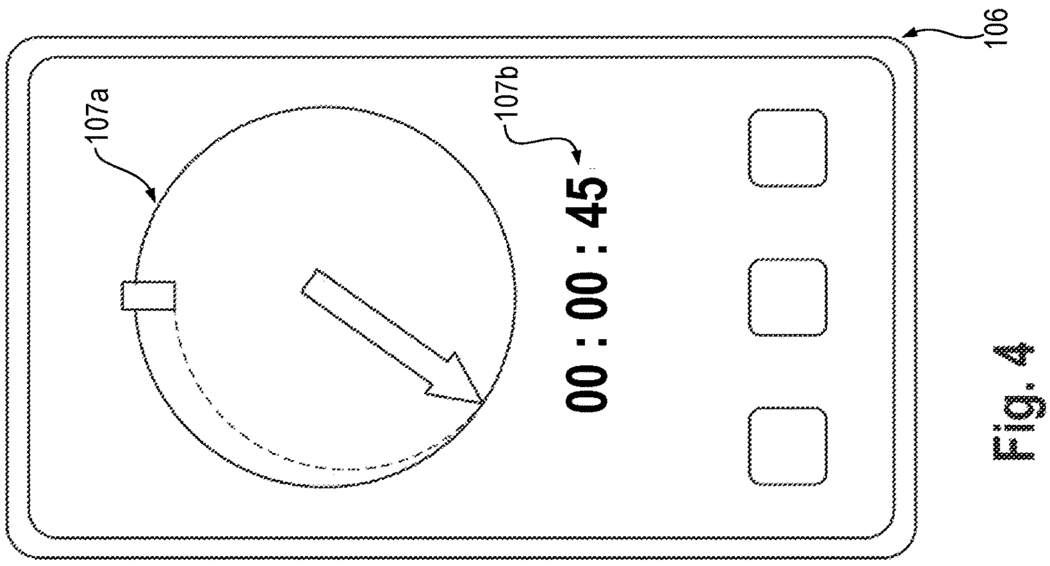
FIG. 4 shows a rough schematic view of a receiving device for outputting time information.

The output device 66 further comprises a transmitting/receiving unit 104, which in wireless fashion and in a suitable data protocol is able to transmit data to and receive data from a receiving device set up for communication with it, for example the receiving device 106 in FIGS. 4 and 5.

The output device 66 further includes a first display device 108, for example in the form of a monitor, for the externally perceptible display of time information about a next material feed into the material feeding apparatus 22. In the illustrated specific embodiment, the output device 66 also includes a second display device 110, for example again a monitor, for the externally perceptible display of time information and location information about a next stockpile reduction. For this purpose, the display device 110 indicates not only time information as to when a next stockpile reduction should begin, but also location information as to which of the stockpiles should be reduced at the indicated time, and possibly also by what amount the indicated stockpile should be reduced.

The backhoe 20 further comprises a transmitting/receiving device 112 including a data memory, which is set up for communication with the transmitting/receiving unit 104 of the rock processing apparatus 12. The transmitting/receiving device 112 is thus able to transmit to the transmitting/receiving unit 104 relevant data about the backhoe 20, such as the holding capacity of its bucket 21 as its loading tool and/or its current GPS data.

The wheel loader 58 accordingly comprises a transmitting/receiving device 114 including a data memory, which is set up for communication with the transmitting/receiving unit 104 of the rock processing apparatus 12. The transmitting/receiving device 112 is thus able to transmit to the transmitting/receiving unit 104 relevant data about the wheel loader 58, such as the holding capacity of its bucket 59 as its removal tool and/or its current GPS data.

In the illustrated example, the data memory 62 contains multiple data relationships, which link operating parameters and/or material parameters with one another. These data relationships may be ascertained in advance by test operations with specific parameter variations and stored in the data memory 62. In particular for more complex multidimensional data relationships, the use of methods of artificial intelligence is helpful for ascertaining causal relationships between operating parameters and/or material parameters. In the further operation of the rock processing apparatus 12, the data relationships thus ascertained may be continuously verified, refined and/or corrected, again preferably using methods of artificial intelligence.

The discontinuous material feed naturally results in a surge-like material feed, a surge of fed material being limited by the size of the bucket 21 of the backhoe 20. The time intervals between two discontinuous material feeds are not predictable and will fluctuate.

To avoid interruptions in the operational sequence of the rock processing apparatus 12, the control unit 60 ascertains on the basis of detection signals of one or multiple of the previously mentioned sensors a piece of time information, which represents an execution time of a future, in particular next, material feed into the material feeding apparatus 22.

For this purpose, the control unit 60 preferably uses the ascertained locally differentiated fill ratio of the material buffer 24 and takes into consideration the conveying capacities of the trough conveyor 26 and for example of the undersize grain conveyor apparatus 29 as well as of the first conveyor apparatus 32. An analysis of the material streams of the trough conveyor 26 into the impact crusher 14 and of the undersize grain conveyor apparatus 29 and the first conveyor apparatus 32 away from the impact crusher 14 indicates whether the fill ratio of the impact crusher 14 changes over time, for example grows or diminishes, and thus indicates whether the conveying capacity of the trough conveyor 26 can be maintained or must be changed. The conveying capacity of the trough conveyor 26, however, determines how quickly the material buffer 24 is depleted and should be loaded again with material. Alternatively or additionally, a sensor may also be provided on the rock processing apparatus 12 for detecting the fill ratio of the impact crusher 14 directly.

The control unit 60 also considers the quantity of returned oversize grain, since the oversize grain fraction 34 also contributes to the fill ratio of the material buffer 24.

A predefined data relationship stored in the data memory 62 may link the detection signals of the camera 70, of the first belt scale 84, of the speed sensor 86, of a belt scale and a speed sensor on the undersize grain discharge conveyor apparatus, of the belt scale 92 and of the speed sensor 94 of the oversize grain conveyor apparatus 36 and of the size of the bucket 21 of the backhoe 20, possibly by taking the distance of the backhoe 20 from the material feeding apparatus 22 into consideration, as input variable with a piece of time information as the output variable, which indicates when a next material feed into the material feeding apparatus 22 is to take place. This time information on the one hand may be displayed on the first output device 108 in a suitable form, for example as an hourglass, waiting time bar, time countdown or analog clock representation, perceptible for anyone within visual range of the rock processing apparatus 20.

The time information may also be transmitted by the transmitting/receiving unit 104 to a mobile receiving device 106, which is available to the machine operator of the backhoe 20. The mobile receiving device 106 may be a portable mobile device, such as a mobile telephone, a tablet computer and the like, or may be permanently installed in the backhoe as part of its control unit and may remain in the backhoe 20.

FIG. 4 shows by way of example a representation of a piece of time information on the receiving device 106 both graphically in the upper half by indicator representation 107*a* as well as alphanumerically in the lower half by time countdown 107*b*. In the illustrated case, a next material feed is desired in 00 minutes and 45 seconds.

The control unit 60 is thus able successively to control the discontinuous material feed and able to ensure a good flow of material in the rock processing apparatus 12 in spite of the discontinuity of the material feed.

Due to the local or regional resolution of the fill ratio in the material feeding apparatus 22 or in material buffer 24, the control unit 60 on the basis of a further data relationship stored in the data memory 62 is also able to control the next material feed not only in terms of time, but also spatially within the overall feed area 102 of the material buffer 24 or material feeding apparatus 22 or to indicate a piece of location information about a preferred material feed location within the overall feed area 102.

For the specific construction type of the material feeding apparatus 22 and the rock processing apparatus 12 as a whole, which may be identified parametrically in the data memory 62 so as to be usable for the control unit 60, the control unit 60 is thus able to advance the loading of the material buffer 24 in the most advantageous manner possible over the entire operating time of the rock processing apparatus 12.

Local overfilling of the material buffer 24 may thus be avoided as well as a direct feed of material onto the pre-screen 16. Furthermore, in places where locally the fill ratio within the material buffer 24 has fallen sharply, material may be fed to ensure an advantageous material bed in the material feeding apparatus 22.

On the basis of a predetermined data relationship, the control unit 60 is thus able to output location information to the machine operator of the backhoe 20 indicating where a next material feed should be provided within the overall feed area 102.

Via the projection device 100, the output device 66 is able to output this location information in a manner that is visible for everyone in that the projection device 100 within the overall feed area 102 or within the material buffer 24 projects a marker at the location at which the next material feed should take place.

Additionally or alternatively, the location information, as previously already the time information for the next material feed, may be output via the receiving device 106 to the machine operator of the backhoe 20. FIG. 5 shows an exemplary embodiment for a location information output. The receiving device 106 displays a schematic rendering 197*c* of the material buffer 24 with the overall feed area 102 and marks therein by a suitable marker 116 the desired feed location within the overall feed area 102 for the next material feed. Additionally, a preferred discharge height or a discharge height range may be indicated quantitatively, for example in meters and/or centimeters, or qualitatively, for example by indicating qualitative discharge height parameters such as "low", "medium" and "high". Particularly when communicating the location information to a, possibly partially automatic, backhoe control, the additional height information may be readily implemented.

Using the first stockpile sensor 96 and/or the second stockpile sensor 98 at the respective discharge conveyor apparatuses 29, 42 and 46, the control unit 60 is able to detect a growth of the stockpiles 30, 44 and 48 produced by the rock processing apparatus 12 by considering material parameters such as the type of the fed material, the grain size and grain size distribution and the bulk density possibly resulting therefrom, and is able above all to detect a rate of change or growth rate of the respective stockpile and, by using a previously produced and stored data relationship, to ascertain a piece of reduction time information indicating when a particular stockpile should be reduced by the wheel loader 58. This makes it possible to prevent the stockpile from growing excessively and from blocking a discharge via the discharge conveyor apparatus producing the respective stockpile.

Furthermore, by taking into consideration material parameters, such as the grain size and grain size distribution as well as the density, the control apparatus, by using a data relationship ascertained for this purpose, is able to ascertain a further piece of reduction information, which indicates to what extent a reduction is to take place.

If the rock processing apparatus 12, as in the present case, produces multiple stockpiles, then the output device 66 additionally outputs a further piece of reduction information, which identifies the stockpile to which the reduction time information pertains.

The control unit 60 is able to display the reduction time information and the further pieces of reduction information on the second display device 110 so as to be perceptible to anyone within the visual range of the rock processing apparatus 12. Additionally or alternatively, the output device 66 may transmit, via the transmitting/receiving unit 104, the pieces of information about the next stockpile reduction to the receiving device 106, where it is output to the machine operator of the wheel loader 58 in graphical and/or alphanumerical fashion.

Finally, from detection signals of suitable sensors, the control unit 60 is able to control operating parameters of the rock processing apparatus 12 in such a way that a predetermined desired ratio of fine grain quantity and medium grain quantity is obtained in the illustrated exemplary embodiment. In the same way, on the basis of appropriately prepared data relationships, the control unit 60 is able to control the rock processing apparatus 12 in such a way that its energy consumption per unit of quantity of processed mineral material reaches or is reduced to at least a local minimum. Additionally or alternatively, by using appropriately prepared data relationships, the control unit 60 is able to control the rock processing apparatus 12 in such a way that a quantity of oversize grain advantageous for the respective crushing process is returned so that a sufficient amount of support grain is present in the crush gap or in the crush gaps in the form of pre-crushed oversize grain. Indeed, an operation with the aim of minimizing or eliminating the amount of oversize grain is not necessarily the most economical operation of the rock processing apparatus 12 due to the advantageous effects of oversize grain as support grain in the crush gap. Frequently, a very small amount of oversize grain implies an excessively large amount of material that is crushed too finely, which is normally not desired. If the amount of returned material decreases, the quality of the final product often decreases along with it, since the final product then contains less repeatedly crushed material.

On the basis of the available data relationships ascertained in advance by test operations with specific parameter variation, the control unit 60 may also aim for an operation of the rock processing apparatus 12 on the basis of multiple target variables or one target variable with further specified boundary conditions, such as for example the production of value grain having different grain sizes in a predetermined quantitative proportion at lowest possible energy consumption and at the most advantageous amount of returned oversize grain.

For setting the operation of the rock processing apparatus 12 in accordance with the output variables of the at least one utilized data relationship, the control unit 60 may change the conveying speed of one or multiple conveyor apparatuses, may change the crush gap width, in particular of the upper and/or of the lower crush gap, may change the rotor speed, may control the material feed into the material feeding apparatus 22 spatially and temporally, etc.

The input variables used for optimizing the operation may be the size and/or the height and/or the growth of value grain stockpiles, presently for example the value grain stockpiles 44 and 48, the size and/or the height and/or the growth of the stockpile of the undersize grain fraction 30, the quantity of returned oversize grain, the fed grain size and fed grain size distribution, which are primarily ascertainable via the material parameters input via the input device 64. The input material parameters may comprise at least one material parameter of: the type of material, degree of humidity, hardness, density, crushability, abrasiveness, proportion of foreign substances in the fed and/or processed material, etc., the grain size and grain size distribution in the individual discharge conveyor apparatuses. The enumeration is not conclusive. In the discharge conveyor apparatuses, the grain size and grain size distribution, possibly also the grain shape, may be ascertained by cameras with subsequent image processing. The grain size and the grain size distribution in a discharge conveyor apparatus may be ascertained additionally or alternatively by the occupancy of a screening device upstream of the respective discharge conveyor apparatus in the flow of material. Additionally or alternatively, the desired setpoint quantity of a respective final product may be used as input variable for optimizing the operation.

By application of methods of artificial intelligence, the control unit 60, if desired with the involvement of powerful external data processing devices, is able continuously to improve the targeted precision of the stored data relationships by its daily operation and the data and findings gathered in the process.

The rock processing apparatus 12 itself is thus not only able to improve its own operation but is basically able successively to take over the organization of the entire job site in the vicinity of the rock processing apparatus 12.

In the illustrated exemplary embodiment, the sole rock processing apparatus 12 is a rock processing system.

What is claimed is:

1. A rock processing system including at least one rock processing apparatus for crushing and/or sorting granular mineral material according to size, the rock processing system comprising as system components:

a material feeding apparatus having a material buffer for loading starting material to be processed;

at least one working unit comprising at least one crushing apparatus and/or at least one screening apparatus;

at least one conveyor apparatus configured to convey material between system components;

at least two discharge conveyor apparatuses configured to convey processed material out of the rock processing system onto a stockpile, each of the at least two discharge conveyor apparatuses conveying processed material of a different value grain grading curve output by the at least one screening apparatus;

at least one quantity sensor for each of the at least two value grain grading curves, respectively configured to detect a quantity variable representing a discharge quantity of processed material accruing per unit of time in the respective value grain grading curve; and a data memory connected in signal-transmitting fashion to a control unit and/or to the at least one quantity sensor;

wherein the control unit is configured to control an operation of at least one system component according to detection signals, which represent the discharge quantities accruing per unit of time in different value grain grading curves, and according to at least one data relationship stored in the data memory, which, by taking into consideration at least one predetermined target variable or at least one predetermined target variable range, sets the detection signals of the at least one quantity sensor and/or a value derived from the detection signals of the at least one quantity sensor quantitatively or qualitatively in relation to at least one control operating parameter and/or to at least one change of a control operating parameter of at least one system component.

2. The rock processing system of claim 1, wherein:

a target variable of the at least one predetermined target variable is a setpoint quantity variable defined for each of the at least two value grain grading curves, which indicates a quantity of value grain which the respective value grain grading curve is to discharge per unit of time;

wherein the control unit is configured to change at least one control operating parameter of at least one system component according to the detection signals and the at least one data relationship in such a way that the actual quantity variable of the respective value grain grading curve is within a predetermined tolerance range around its respective setpoint quantity variable and/or that an actual quantity ratio of two different value grain grading curves is within a predetermined tolerance range around a setpoint quantity ratio.

3. The rock processing system of claim 1, comprising:

at least one oversize grain return apparatus configured to convey an oversize grain screen fraction back into the material feeding apparatus or into an input area of a crushing apparatus of the rock processing system; and an oversize grain quantity sensor configured to detects a quantity of oversize grain returned per unit of time in at least one of the at least one oversize grain return apparatus, an oversize grain data relationship being stored in the data memory, which, by taking into consideration the at least one predetermined target variable or the at least one predetermined target variable range, sets the detection signals of the at least one oversize grain quantity sensor and/or a value derived from the detection signals of the at least one oversize grain quantity sensor quantitatively or qualitatively in relation to at least one control operating parameter and/or to at least one change of a control operating parameter of at least one system component;

wherein the control unit is configured to change at least one control operating parameter of at least one system component according to the detection signals of the at least one oversize grain quantity sensor, the at least one predetermined target variable or the at least one predetermined target variable range and the at least one oversize grain data relationship.

4. The rock processing system of claim 3, wherein:

a target variable of the at least one predetermined target variable is a setpoint oversize grain quantity variable, which indicates the quantity of oversize grain that is to be returned per unit of time; and the control unit is configured to change at least one control operating parameter of at least one system component according to the detection signals of the at least one oversize grain quantity sensor and the at least one oversize grain data relationship in such a way that an actual oversize grain quantity variable of at least one of the at least one oversize grain return apparatus is within a predetermined tolerance range around a setpoint oversize grain quantity variable.

5. The rock processing system of claim 1, comprising at least one of the following operation sensors configured to detect at least one detection operating parameter associated with the respective operation sensor:

at least one energy consumption sensor configured to detect an energy consumption of the rock processing system and/or of one of its system components as the detection operating parameter associated with the energy consumption sensor;

at least one throughput quantity sensor configured to detect a throughput quantity of material processed by the rock processing system and/or one of its system components per unit of time as the detection operating parameter associated with the throughput quantity sensor;

at least one crushing apparatus load sensor configured to detect an operating load of at least one crushing apparatus of the at least one crushing apparatus as the detection operating parameter associated with the load sensor;

at least one screening apparatus load sensor configured to detect an operating load of at least one screening apparatus of the at least one screening apparatus as the detection operating parameter associated with the load sensor;

at least one drive apparatus load sensor configured to detect an operating load of at least one drive apparatus of the rock processing system as the detection operating parameter associated with the drive apparatus load sensor;

an overload counter configured to detect a number of overload cases of at least one system component occurring per unit of time as the detection operating parameter associated with the overload counter;

a wear sensor configured to detect a wear occurring on a system component as the detection operating parameter associated with the wear sensor;

at least one material buffer fill ratio sensor configured to detect a fill ratio of the material buffer as the detection operating parameter associated with the material buffer fill ratio sensor;

at least one conveyor apparatus fill ratio sensor configured to detect a fill ratio of at least one conveyor apparatus as the detection operating parameter associated with the conveyor apparatus fill ratio sensor;

at least one conveyor apparatus conveying speed sensor configured to detect a conveying speed of at least one conveyor apparatus as the detection operating parameter associated with the conveyor apparatus conveying speed sensor;

at least one crushing apparatus fill ratio sensor configured to detect a fill ratio of at least one crushing apparatus of the at least one crushing apparatus as the detection operating parameter associated with the crushing apparatus fill ratio sensor; and at least one crush gap sensor configured to detect a dimension of a crush gap of at least one crushing apparatus of the at least one crushing apparatus as the detection operating parameter associated with the crush gap sensor;

wherein an operating parameter data relationship is stored in the data memory, which, by taking into consideration the at least one predetermined target variable or the at least one predetermined target variable range, sets the detection signals of the at least one operation sensor and/or a value derived from the detection signals of the at least one operation sensor quantitatively or qualitatively in relation to at least one control operating parameter and/or to at least one change of a control operating parameter of at least one system component, and wherein the control unit is configured to change at least one control operating parameter of at least one system component according to the detection signals of the at least one operation sensor, of the at least one predetermined target variable or of the at least one predetermined target variable range and of the at least one operating parameter data relationship.

6. The rock processing system of claim 5, wherein:

a target variable of the at least one predetermined target variable is a setpoint value of the at least one detection operating parameter; and the control unit is configured to change at least one control operating parameter of at least one system component according to the detection signals of the at least one operation sensor, of the at least one predetermined target variable or of the at least one predetermined target variable range and of the at least one operating parameter data relationship in such a way that an actual value of at least one detection operating parameter is within a predetermined tolerance range around the setpoint value of the at least one detection operating parameter.

7. The rock processing system of claim 1, comprising at least one material sensor configured to detect at least one of the following material parameters relating to the fed material: a type of the fed material; a humidity of the fed material; a density of the fed material; a hardness of the fed material; a crushability of the fed material; an abrasiveness of the fed material; a state of the fed material; a grain size of the fed material; a grain size distribution of the fed material; a grain shape of the fed material; a quantity of the fed material, and a proportion of non-crushable foreign material in the fed material;

wherein a material parameter data relationship is stored in the data memory, which, by taking into consideration the at least one predetermined target variable or the at least one predetermined target variable range, sets the detection signals of the at least one material sensor and/or a value derived from the detection signals of the at least one material sensor quantitatively or qualitatively in relation to at least one control operating parameter and/or to at least one change of a control operating parameter of at least one system component; and wherein the control unit is configured to change at least one control operating parameter of at least one system component according to the detection signals of the at least one material sensor, of the at least one predetermined target variable or of the at least one predetermined target variable range and of the at least one material parameter data relationship.

8. The rock processing system of claim 1, wherein the at least one control operating parameter comprises at least one of the following operating parameters: a conveying capacity of a conveyor apparatus conveying material to the crushing apparatus; an amplitude of a pre-screen excitation; a frequency of a pre-screen excitation; a crush gap width; a speed of a crushing rotor; a speed of a screen rotor or a screen drive shaft; a setpoint fill ratio of the crushing apparatus; an amplitude of a post-screen excitation; a frequency of a post-screen excitation.

9. The rock processing system of claim 1, comprising an input device connected in signal-transmitting fashion to the control unit and configured to input at least one input parameter, wherein an input parameter data relationship is stored in the data memory, which, by taking into consideration the at least one predetermined target variable or the at least one predetermined target variable range, sets the at least one input parameter and/or a value derived from the at least one input parameter qualitatively and/or quantitatively in relation to at least one control operating parameter and/or to at least one change of a control operating parameter of at least one system component.

10. The rock processing system of claim 9, wherein the at least one input parameter of the at least one input parameter is one of the following parameters: a quantity of oversize grain returned per unit of time; an energy consumption of the rock processing system and/or of one of its system components; a throughput quantity of material processed by the rock processing system and/or by one of its system components per unit of time; an operating load of at least one crushing apparatus (14) of the at least one crushing apparatus; a number of overload cases of at least one system component occurring per unit of time; a wear occurring on a system component per unit of time; a type of the fed material; a hardness of the fed material; a crushability of the fed material; an abrasiveness of the fed material; a grain size of the fed material; a grain size distribution of the fed material; a quantity of the fed material.

11. The rock processing system of claim 1, wherein the at least one quantity sensor comprises at least one of the following sensors: a conveyor belt scale configured to ascertain a weight of a material quantity fed onto a conveyor belt of the conveyor apparatus; and a stockpile sensor configured to detect a stockpile parameter, comprising a height and/or a shape and/or a volume of a stockpile, and/or to detect a rate of change over time of the stockpile parameter.

12. The rock processing system of claim 11, wherein the stockpile sensor comprises a sensor operating according to a reflection principle.

13. The rock processing system of claim 12, wherein the stockpile sensor comprises an ultrasonic sensor or a radar sensor.

14. The rock processing system of claim 11, wherein the stockpile sensor comprises an optical camera with associated image processing.

* * * * *